UNITED STATES PATENT OFFICE.

HALVOR BERGLIN, OF MINNEAPOLIS, MINNESOTA.

COMPOSITION OF METALS.

SPECIFICATION forming part of Letters Patent No. 375,917, dated January 3, 1888.

Application filed May 23, 1887. Serial No. 239,604. (Specimens.)

*To all whom it may concern:*

Be it known that I, HALVOR BERGLIN, of Minneapolis, in the county of Hennepin, State of Minnesota, have invented certain Improvements in Composition of Metals, of which the following is a specification.

My invention relates particularly to improvements in composition metals, and the object that I have in view is to produce a composition that will have a bright yellow appearance resembling gold, that will not tarnish, is soft and may be easily worked, and is especially adapted for manufacturing watch-cases, chains, sleeve-buttons, and other articles of personal wear; and the invention consists, generally, in the composition herein described, and particularly pointed out in the claim.

In carrying out my invention I take the following substances, in substantially the proportions specified, to wit: copper, one pound; tin, one ounce; German silver, five to six ounces; cyanide of potassium, one-quarter to one-half ounce; sulphide of antimony, one-quarter to one-half ounce. The German silver should be of the highest grade. A suitable composition for that would consist of one part nickel, one part of zinc, and two parts of copper. I first put the copper in a crucible, and after it has melted I add one ounce of tin for each pound of copper. After these have melted and been mixed together I add five to six ounces of German silver, and after these have melted and been mixed together I add one-half ounce of sulphide of antimony and one-half ounce of cyanide of potassium. The object of this last ingredient is to clean the metal. The resultant composition will then be cast in suitable molds, and may be used in the manufacturing of the various articles hereinbefore specified. This composition may be easily worked, and possesses many advantages adapting it for the manufacture of all kinds of metal articles for personal wear.

The resulting ingredients of the finished metal, as determined by analysis, will be substantially as follows: 83.23 per cent. copper, 3.48 per cent. tin, 8.16 per cent. zinc, 4.92 per cent. nickel, and .04 per cent. antimony. By varying the amount of the German silver I slightly increase or diminish the proportion of the zinc and nickel, which is done to give a deeper or lighter color, as desired. The cyanide of potassium and the sulphide of antimony may be slightly varied without affecting the compound, as these ingredients are nearly all driven off by the heat.

I claim as my invention—

The composition hereinbefore described, consisting of the following ingredients, in substantially the proportions specified, to wit: copper, 83.23; tin, 3.48; zinc, 8.16; nickel, 4.92; antimony, .04.

In testimony whereof I have hereunto set my hand this 23d day of May, 1887.

HALVOR BERGLIN.

In presence of—
A. C. PAUL,
J. N. OLSON.